United States Patent [19]

Lichtenberg

[11] Patent Number: 5,336,001
[45] Date of Patent: Aug. 9, 1994

[54] MAXIMUM COMFORT KEYBOARD

[76] Inventor: Allan C. Lichtenberg, 399 W. Fullerton Ave., Chicago, Ill. 60614

[21] Appl. No.: 925,796

[22] Filed: Aug. 4, 1992

[51] Int. Cl.$^5$ .................................. B41J 5/10
[52] U.S. Cl. .................................. 400/489; 400/472; 400/486; 345/168
[58] Field of Search ............ 400/472, 484–489, 400/492, 496; 235/145 R; 340/711; 434/227, 231; 178/17 C, 79, 80, 81; 345/168, 169

[56] References Cited

U.S. PATENT DOCUMENTS

| | | | |
|---|---|---|---|
| D. 323,817 | 2/1992 | Buchin | D14/100 |
| 2,369,807 | 2/1945 | Solon | 400/489 |
| 3,929,216 | 12/1975 | Einbinder | 400/484 |
| 3,945,482 | 3/1976 | Einbinder | 400/486 |
| 3,990,565 | 11/1976 | Felton et al. | 400/70 |
| 4,332,493 | 6/1982 | Einbinder | 400/484 |
| 4,483,634 | 11/1984 | Frey et al. | 400/489 |
| 4,509,873 | 4/1985 | Ryan | 400/489 |
| 4,579,470 | 4/1986 | Casey | 400/489 |
| 4,597,681 | 7/1986 | Hodges | 400/488 |
| 4,613,247 | 9/1986 | McGunnigle | 400/486 |
| 4,661,005 | 4/1987 | Lahr | 400/489 |
| 4,669,903 | 6/1987 | Herzog et al. | 400/489 |
| 4,804,279 | 2/1989 | Berkelmans | 400/94 |
| 4,808,017 | 2/1989 | Sherman et al. | 400/83 |
| 4,824,268 | 4/1989 | Diernisse | 400/486 |
| 4,897,649 | 1/1990 | Stucki | 341/22 |
| 5,017,030 | 5/1991 | Crews | 400/485 |
| 5,029,260 | 7/1991 | Rollason | 235/145 R |
| 5,044,798 | 9/1991 | Roylance et al. | 400/472 |
| 5,059,048 | 10/1991 | Sirkin | 400/486 |
| 5,067,834 | 11/1991 | Szmanda et al. | 400/489 |
| 5,073,050 | 12/1991 | Andrews | 400/82 |
| 5,119,078 | 6/1992 | Grant | 340/711 |
| 5,129,747 | 7/1992 | Hutchison | 400/489 |
| 5,156,475 | 10/1992 | Zilberman | 400/472 |

FOREIGN PATENT DOCUMENTS 2218065 10/1973 Fed. Rep. of Germany .
0024740 of 1906 United Kingdom .................. 400/489

OTHER PUBLICATIONS

IBM Technical Disclosure Bulletin, vol. 27, No. 10A, Mar. 1985, "Compact Computer Keyboard".
Barnaby J. Feder, "Different Strokes for Computing," New York times, Aug. 9, 1992.

*Primary Examiner*—Edgar S. Burr
*Assistant Examiner*—Christopher A. Bennett
*Attorney, Agent, or Firm*—Leydig, Voit & Mayer, Ltd.

[57] ABSTRACT

A keyboard comprising a plurality of alphanumeric keys or function keys separated into a left key section containing the keys operated by the left hand and a right key section containing the keys operated by the right hand. The longitudinal axes of the rows within each section are substantially parallel to each other and substantially perpendicular to the longitudinal axes of the operator's forearms. Each column of the keyboard is substantially aligned with the line of movement of the finger controlling the respective column in order to accommodate the natural fan-like movement of the operator's fingers as the fingers curl and uncurl during the typing operation. The parallel rows and the transverse columns of the alphabetic keys form a substantially trapezoidal shape, wherein the length of the rows is progressively larger from the bottom row to the top row, which permits the operator's fingers to make a fan-like movement in contrast to the conventional keyboard which constrains finger movement to narrow parallel columns. The trapezoidal shape permits the operator's fingers to move up and outward relative to the palm when typing keys in the top row and down and inward toward the palm when typing keys in the bottom row. The length of the rows is varied by altering the size of the individual alphabetic keys based on the natural lines of movement of the finger and the level of dexterity exhibited by each finger. Generally, outer and upper keys are slightly larger than inner and lower keys.

42 Claims, 6 Drawing Sheets

MAXIMUM COMFORT KEYBOARD

FIELD OF THE INVENTION

The present invention relates generally to keyboards for computers, typewriters, and similar machines and, more particularly, to an ergonomically designed keyboard for maximum comfort and efficiency.

BACKGROUND OF THE INVENTION

Conventional keyboards for computers, typewriters, or similar machines typically have a set of keys all aligned substantially in a single plane that may be flat or slightly tilted toward the operator. The standard QWERTY key format used by the majority of operators throughout the world has three rows of ten keys in standard positions and arranges the alphabetic keys in parallel rows and parallel columns. The alphabetic keys include the 26 letter keys and typically four punctuation keys, i.e., ";", ",", "." and "/" or "?". In addition to the alphabetic keys, conventional keyboards may also have numeric and/or function keys which are typically located above, below, or on one or both sides of the alphabetic keys. The function keys may typically include, for example, the tab, shift, and return keys as well as the alt, control, and option keys.

During the typing operation, the operator's forearms are positioned at inwardly directed angles from the operator's sides toward the keyboard, with the palms down and the hands generally flat. The wrists are bent and the hands are angled outwardly relative to the forearms in order to align the operator's fingers in directions running from the front to the back of the keyboard. The fingers move in narrow parallel lines from the lower left to the upper right of the keyboard. This is not a natural, normal or restful position for human hands and fingers. The wrists tend to be naturally unbent or straight and in alignment with the forearm, not at the angle required for typing on a conventional keyboard, and the fingers tend to be slightly spread and move in a fan-like orientation.

Adverse physical conditions may arise in the operator's wrists, hands and fingers resulting from the repetitive motions associated with typing, particularly for long periods on any given day or successive days. Such adverse conditions are compounded by the crude design of conventional keyboards which forces the orientation of the operator's wrists, hands and fingers into particularly awkward and unnatural angles for prolonged periods of time. Typing injuries may fall into one of a few overlapping categories: repetitive stress disorder, repetitive motion injury, cumulative trauma disorder, and carpal tunnel syndrome. These conditions often require medical attention and, in severe cases, the worker may be unable to perform normal work functions. The cost in human suffering, and on-going medical expenses may be severe.

Attempts to redesign the traditional keyboard, either by redesigning the construction of the keyboard or redesigning the arrangement of the keys, have been largely unsuccessful. The attempts to redesign the construction of the keyboard have included, for example, separating the keyboard into left and right portions so that the left and right portions can slide along on a track facing the operator or pivoting the left and right portions of keyboard so that they can be vertically inclined about each other. The attempts to redesign the arrangement of the keys have included, for example, separating the keys into left and right sections containing substantially parallel rows and parallel columns of keys or even completely rearranging the conventional position of the alphanumeric keys.

These design changes have not adequately accounted for the natural ergonomic orientation and movement of the human wrists, hands and particularly the fingers during the typing operation. For example, in the designs which have separated the left and right sections so that each section can be vertically pivoted about each other, the hands are inherently unstable when positioned in the vertical planes. The operator's hands may become tired and strained if elevated too long. Further, it is difficult to see the keys in both sections when each portion of the keyboard is facing in opposite directions. The designs typically have numerous parts which are expensive to manufacture and relatively difficult to assemble. The rearrangement of the standard position of the keys also requires substantial operator retraining.

OBJECTS AND SUMMARY OF THE INVENTION

It is an object of the present invention to provide a keyboard which accommodates the ergonomic movement of the operator's forearms, wrists, hands and fingers.

It is a related object of the present invention to provide a keyboard which accommodates the natural orientation of the operator's forearms and wrists.

Another related object of the present invention is to provide a keyboard which accommodates the natural orientation and movement of the operator's fingers when typing.

A further object of the present invention to provide a keyboard which accounts for the level of dexterity of the operator's individual fingers.

Still another general object of the present invention is to provide a keyboard which maximizes the operator's comfort and increases the operator's speed and efficiency.

It is a more detailed object of the present invention to provide a keyboard which maintains the standard QWERTY key format.

It is also an object of the present invention to provide a keyboard which makes typing with all fingers easier, more logical and more intuitive for beginning and intermediate level typists.

The keyboard comprises a plurality of alphanumeric keys or function keys separated into a left key section containing the keys operated by the left hand and a right key section containing the keys operated by the right hand. Within the left and right sections, the alphabetic keys are arranged in a plurality of rows and columns.

In accordance with one of the objects, the alphabetic keys are inclined to accommodate the natural inclination of the operator's forearms, thereby permitting the operator's wrists to remain substantially straight and unbent. The longitudinal axes of the rows within each section are substantially parallel to each other and substantially perpendicular to the longitudinal axes of the operator's forearms. Specifically, the longitudinal axis of left section is substantially perpendicular to the axis of the left forearm while the longitudinal axis of the right section is substantially perpendicular to the axis of the right forearm. The longitudinal axes of the rows in the left section are transverse to the longitudinal axes of the rows in the right section.

In accordance with another object of the invention, the keyboard accommodates the natural fan-like movement of the operator's fingers as the fingers curl and uncurl during the typing operation. Each column of the keyboard is substantially aligned with the line of movement of the finger controlling the respective column. The longitudinal axes of the columns may be transverse not only to the other columns within the section, but also to the columns in the other section.

It will be appreciated that if the keyboard accommodates the natural inclination of the operator's forearms, wrists and hands and the natural fan-like movement of the operator's hands and fingers, the parallel rows and the transverse columns of the alphabetic keys form a substantially trapezoidal shape. In the trapezoidal shape, the length of the rows is progressively larger from the bottom row to the top row. That is, the length of the middle row is larger than the bottom row and the length of the top row is larger than the middle row. In the preferred embodiment, the length of the rows is varied by altering the size of the individual alphabetic keys, based on the natural lines of movement of the finger and the level of dexterity exhibited by each finger. The trapezoidal shape of the keys permits the operator's fingers to make their natural fan-like movement by permitting the operator's fingers to move up and outward relative to the center of the palm when typing keys in the top row and down and inward toward the palm when typing keys in the bottom row in contrast to the conventional keyboard which constrains the operator's fingers to move in narrow parallel lines. The keys gradually become larger toward the outside of the keyboard to accommodate the less dexterous fingers more adequately.

By separating the keys into left and right key sections and arranging the keys in a fan-like manner, the inward twist in the horizontal plane (ulnar deviation) and the vertical twist in the vertical plane (wrist pronation) are minimized or eliminated, thereby alleviating stress on the wrists and fingers and making typing more comfortable. Furthermore, the present keyboard, with its fan-like structure, makes it more natural for operators to see how to touch-type. The keyboard makes it easier, more logical, and more intuitive for beginning and intermediate level typists to type with all fingers.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
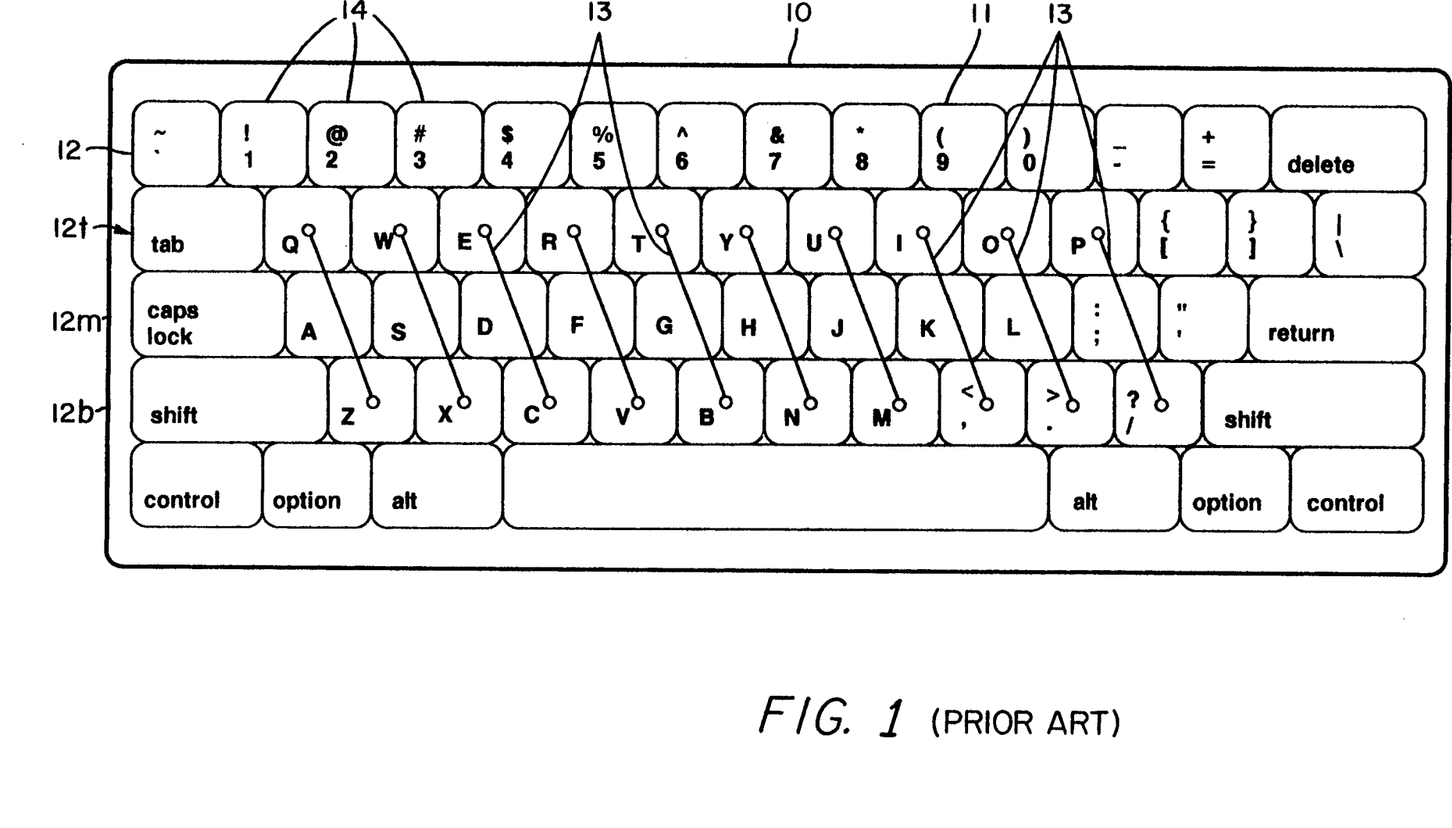
FIG. 1 illustrates the layout of a conventional keyboard.

Turning to the drawings, FIG. 1 illustrates a conventional keyboard 10 and FIGS. 3–6 illustrate a keyboard 20 in accordance with the present invention. It will be appreciated that the keyboard can be connected in any conventional manner to a computer, typewriter, or other appropriate control device. The keys and the internal mechanical or electronic controls for the keys can be constructed in accordance with well known technology. The present invention is particularly directed to the construction and configuration of the keyboard. Consequently, the other elements of the control device are not further discussed other than as necessary to describe clearly the illustrated embodiments of the invention.

Referring to FIG. 1, conventional keyboards 10 have alphanumeric and function keys 11 arranged in a plurality of parallel rows 12 and columns 14. The rows 12 are substantially parallel to each other and to the longitudinal axis of the keyboard 10. The longitudinal axes 13 of the columns between the top and bottom rows of alphabetic keys are parallel and slope downwardly toward the right side of the keyboard 10. FIG. 1 illustrates the standard QWERTY key format which is used by the majority of operators throughout the world. The standard QWERTY key format arranges the alphabetic keys in three rows (bottom row 12$b$, middle row 12$m$, and top row 12$t$) of ten keys in standard positions. The alphabetic keys include the 26 letter keys and typically four punctuation keys: i.e., ";", ",", "." and "/" or "?". In addition to the alphabetic keys, conventional keyboards 10 may also have numeric, punctuation and/or function keys which are typically located above, below, or on one or both sides of the alphabetic keys. The function keys may typically include, for example, the tab, shift, and return keys as well as the alt, control, and option keys. The middle row 12$m$ is sometimes referred to as the home row and the A,S,D,F keys for the left hand and the J,K,L, ';' keys for the right hand are sometimes referred to as the home keys. The keys are typically rectangular or square in shape and slope upwardly toward the left, but it will be appreciated that they can be any other shape including, for example, circular, oval, or wedge-shaped.

Figure 2:
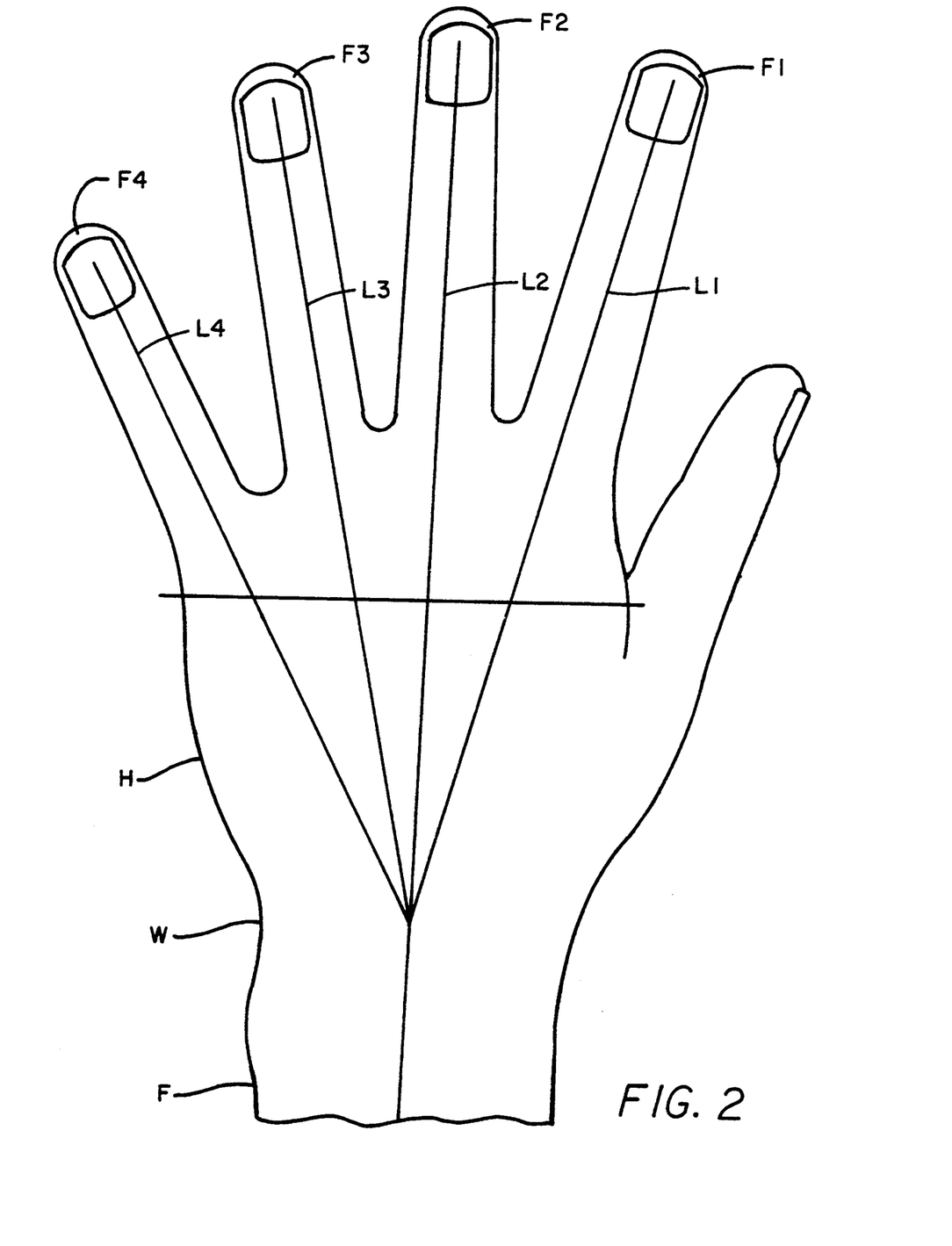
FIG. 2 illustrates a schematic representation of a left hand and the lines of movement formed by the fingers as they curl and uncurl.

FIG. 2 schematically illustrates the line of movement L1–L4 that each finger naturally traverses as the finger curls and uncurls. For convenience, the fingers will be referred to as the first finger F1, second finger F2, third finger F3, and fourth finger F4. Because the thumb is not used to type (except for the space bar), it is excluded from the following discussion unless explicitly referred to. It will be noted that the lines of movement L1–L4 of the fingers, as they curl and uncurl, are naturally not parallel and are transverse to each other so that the hand and fingers tend to make a fan-like shape. The orientation of each line of movement L1–L4 will depend on the operator's hand and finger size and level of dexterity. Because of these lines of movement L1–L4, the operator's fingers have a natural tendency to move up and away from the center of the palm when typing one of the keys in the top row 12$t$ and to move down and inwardly towards the center of the palm when typing one of the keys in the bottom row 12b.

Conventional keyboards 10 are not arranged to permit the natural ergonomic motion of the operator's wrists, hands and fingers. In a natural and unstressed position, the wrists are unbent so that the hand generally aligns with the forearm. In contrast, when typing on a conventional keyboard, the operator's forearms are naturally directed at inwardly projected angles from the operator's sides towards the keyboard, with the palms down and the hands generally flat. Conventional keyboards 10, with their parallel rows 12 and parallel columns 13, force the wrists and hands to bend and angle outwardly relative to the forearms so that the operator's fingers are generally directed front to back of the keyboard 10. The narrow parallel columns 13 which slope downwardly towards the right side of the keyboard 10 force the operator's fingers to move parallel to each other in contrast to the natural fan-like movement traversed by the fingers as illustrated in FIG. 2. Thus, conventional keyboards 10 do not accommodate the natural, normal or comfortable movements of the operator's wrists, hands and fingers and may cause adverse medical conditions.

Figure 3:
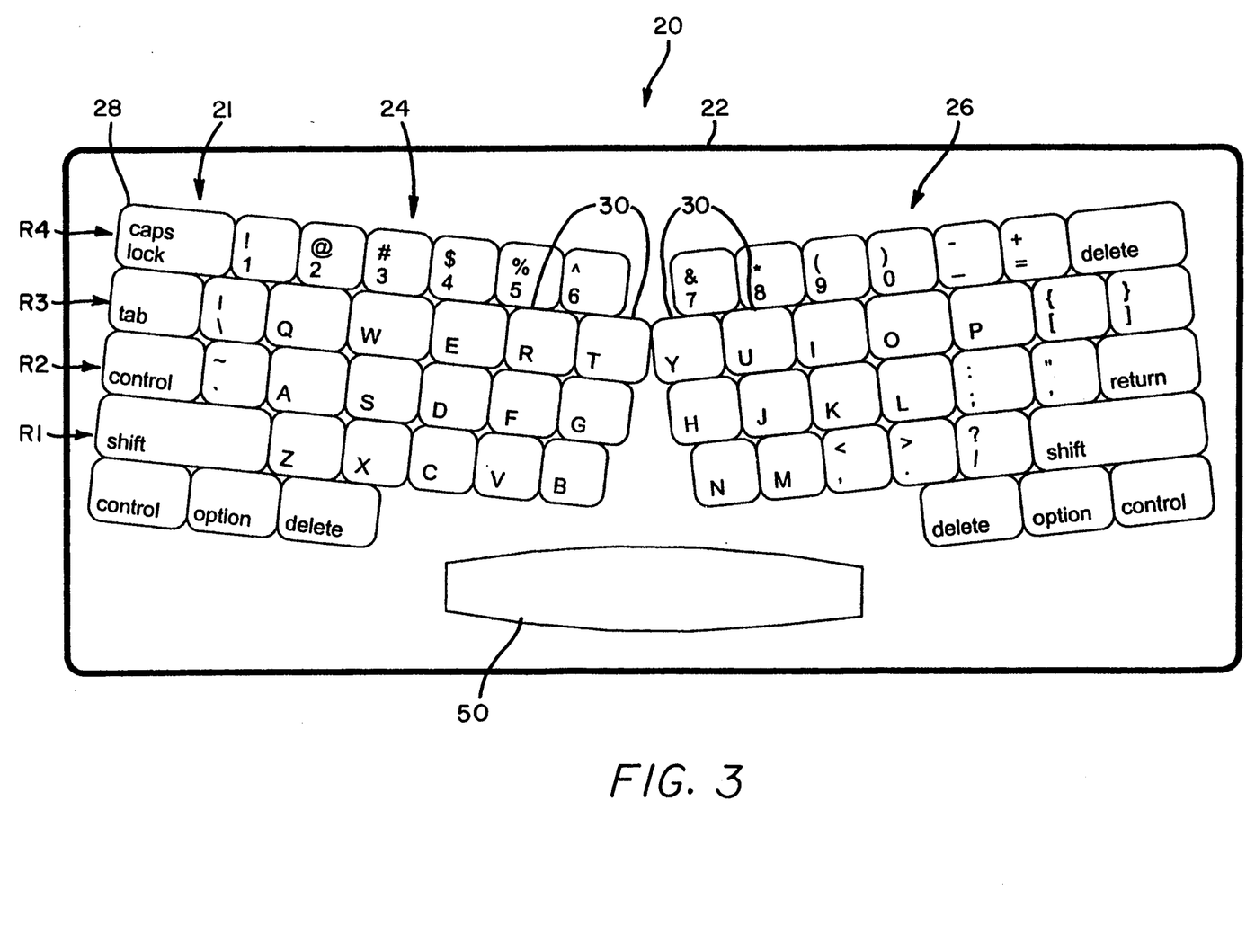
FIG. 3 illustrates the layout of a keyboard in accordance with the present invention.
Figure 4:
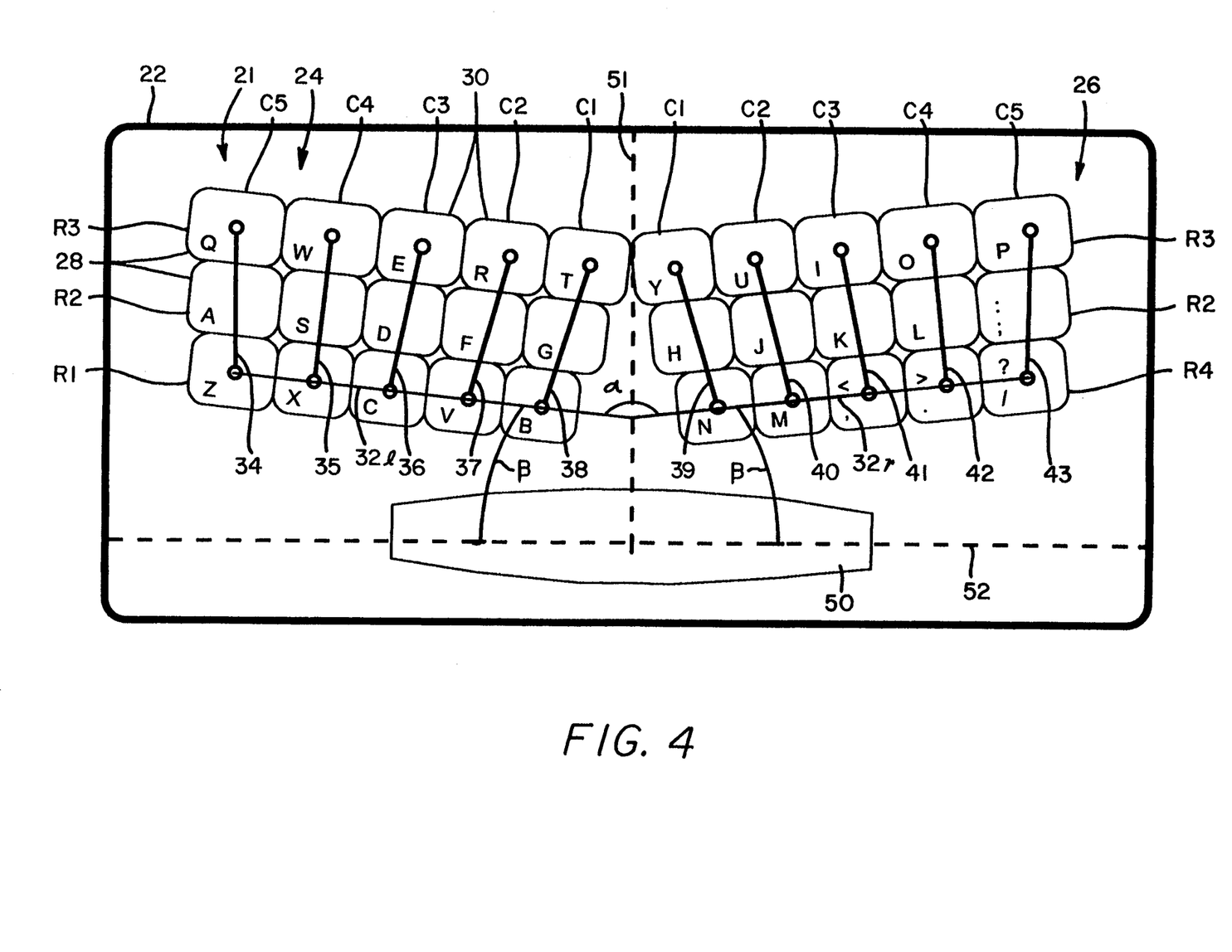
FIG. 4 illustrates the layout of the keyboard in FIG. 3 showing the longitudinal axes of the columns.

FIGS. 3–6 illustrate a preferred embodiment of a keyboard 20 made in accordance with the present invention. The keyboard 20 comprises a rectangular base 22 containing a plurality of alphanumeric keys or function keys in a plurality of rows 28 and columns 30. The embodiment of the keyboard 20 in FIG. 3 illustrates the keys 21 typically found in the QWERTY key format. For convenience, only the alphabetic keys in FIGS. 3–6 are arranged in accordance with the principals of the present invention. The numeric and function keys are not arranged in accordance with the present invention and are only shown for illustrative purposes in FIG. 3. It will be appreciated, however, that the present invention is not limited to the QWERTY key format and is applicable to any other key format including the numeric and function keys. Referring to FIG. 4, individual keys 21 will be referred to by their letter designation, individual rows will be referred to as the bottom R1, middle R2, or top R3 rows, and individual columns will be referred to as first C1, second C2, third C3, fourth C4 and fifth C5 columns progressively from the vertical axis 36 of the alphabetic keys.

In accordance with one of the objects of the invention, the keyboard 20 accommodates the natural inclination of the operator's forearms, wrists, and hands. The alphabetic keys 21 are inclined relative to the longitudinal axis 32 of the keyboard to accommodate the natural inclination of the operator's forearms, thereby permitting the operator's wrists to remain substantially straight and unbent. The keys 21 are separated into a left key section 24 containing the keys 21 operated by the left hand and a right key section 26 containing the keys 21 operated by the right hand. The left and right key sections 24, 26 are disposed about the left and right sides, respectively, of a vertical axis 36 located in the middle portion of the keyboard 20. Within the left and right sections 24, 26, the keys 21 are arranged in a plurality of rows 28 and columns 30. Within each section, the keys 21 in each row 28 are disposed from the inside of the keyboard 20, adjacent to the vertical axis 36, to the outside of the keyboard 20. Within each section, the keys 21 are arranged from the bottom to the top of the keyboard 20. In a preferred embodiment, the longitudinal axes 32 of the rows 28 within each section 24, 26 are substantially parallel to each other and substantially perpendicular to the longitudinal axes of the operator's forearms. Specifically, the longitudinal axis 32l of left section 24 is substantially perpendicular to the axis of the left forearm while the longitudinal axis 32r of the right section 26 is substantially perpendicular to the right forearm. It is appreciated that the rows 28 do not have to be straight but can also be slightly curved or even peak in the center. By orienting the left and right key sections 24, 26 in this manner, the inward twist in the horizontal plane (ulnar deviation) and the vertical twist in the vertical plane (wrist pronation) are minimized or eliminated, thereby alleviating stress on the wrists and making typing more comfortable.

Upon reference to FIG. 4, it will be appreciated that the longitudinal axes 32l, 32r of the rows 28 in the left and right sections 24, 26 are transverse to each other, unlike the conventional keyboard 10 illustrated in FIG. 1 which has rows 12 which are parallel to each other. The longitudinal axes 32l, 32r of the rows 28 makes an angle $\beta$ with the longitudinal axis 52 of the keyboard 20. Similarly, angle $\alpha$ is formed between the longitudinal axes 32l, 32r of the left and right sections 24, 26. It has been found that an angle $\beta$ from about 5° to about 70° or an angle $\alpha$ from about 40° to about 170° will meet most ergonomic needs of an operator. The angles may be changed to accommodate different size operators, if necessary. If desired, the angle $\beta$ for the left section 24 may be different than the angle $\beta$ for the right section 26.

It will be appreciated that even the most skilled operators will occasionally look at the keys 21. Therefore, in accordance with another object of the present invention, the keyboard 20 permits operators to quickly glance at the keys 21 without interrupting their typing. The keyboard 20, including the left and right sections 24, 26, has a substantially planar surface. The planar keyboard 20 presents a stable platform having lateral support for the operator's forearms and hands. Unlike keyboards which have two separated portions which are vertically inclined relative to each other, the planar keyboard 20 permits the operator to quickly see the keys 21. It is also preferred that the left and right sections 24, 26 be immediately adjacent to each other at alphabetic keys rather than numeric keys to minimize the space between the left and right sections 24, 26 and between the left and right hands. Thus, in the embodiments illustrated in FIGS. 4–6, the top keys of the first columns C1 are immediately adjacent to each other, so that their longitudinal axes 38 and 39 form an inverted V-shaped configuration. In the QWERTY key format illustrated in FIGS. 4–6, it is preferred that the T and Y keys, which are the top innermost keys 21 of the first columns C1, be immediately adjacent to preserve the look and feel of a unified and continuous conventional keyboard while still obtaining the ergonomic benefit of the present invention. As illustrated in FIG. 6, in order to facilitate the reading of the keys 21, it is also preferable that the letters be level with the longitudinal axis 52 of keyboard 20 so that the operator can easily read the keys 21.

In accordance with another object of the invention, the keyboard 20 accommodates the natural fan-like movement of the operator's fingers F1–F4 as the fingers curl and uncurl during the typing operation. FIG. 4 illustrates the orientation of the columns C1–C5 and the respective longitudinal axes 34–43 of each column C1–C5 which are measured from the midpoints of the keys 21 in the top and bottom rows. The columns are sequentially arranged from the inside/middle to the outside of the keyboard 20 so that columns C1 are the innermost columns immediately adjacent to the vertical axis 36 and columns C5 are the outermost columns. Each column 30 of the keyboard 20 is substantially aligned with the line of movement L1–L4 of the finger controlling the respective column. By way of illustration, the longitudinal axis 36 of third column C3 of the left section 24 is substantially aligned with the line of movement L2 of finger F2 which controls the keys E, D, C in the third column C3. It will be appreciated that finger F1 controls two columns C1 and C2 so that there might be slight variations in the alignment of longitudinal axes of columns C1 and C2 and the line of movement L1. Thus the longitudinal axes of the columns 30 may be substantially non-parallel or transverse not only to the other columns 30 within the section 24, but also to the columns 30 in the other section 26.

In the illustrated embodiment, within each section, the respective inner angles formed between the longitudinal axes 34–43 of the columns C1–C5 and the longitudinal axis 32 of the rows R1 become larger when moving from the innermost, first column C1 to the outermost, fifth column C5. These inner angles are the angles facing the vertical axis 36 between the left and right sections 24, 26. It will be appreciated that the present invention permits the operator's fingers F1–F4 to move up and outward relative to the palm when typing keys in the top row R3 and down and inward toward the center of the palm when typing keys in the bottom row R1 in contrast to the conventional keyboard 10 which constrains the operator's fingers F1–F4 to move in narrow parallel lines.

Figure 5:
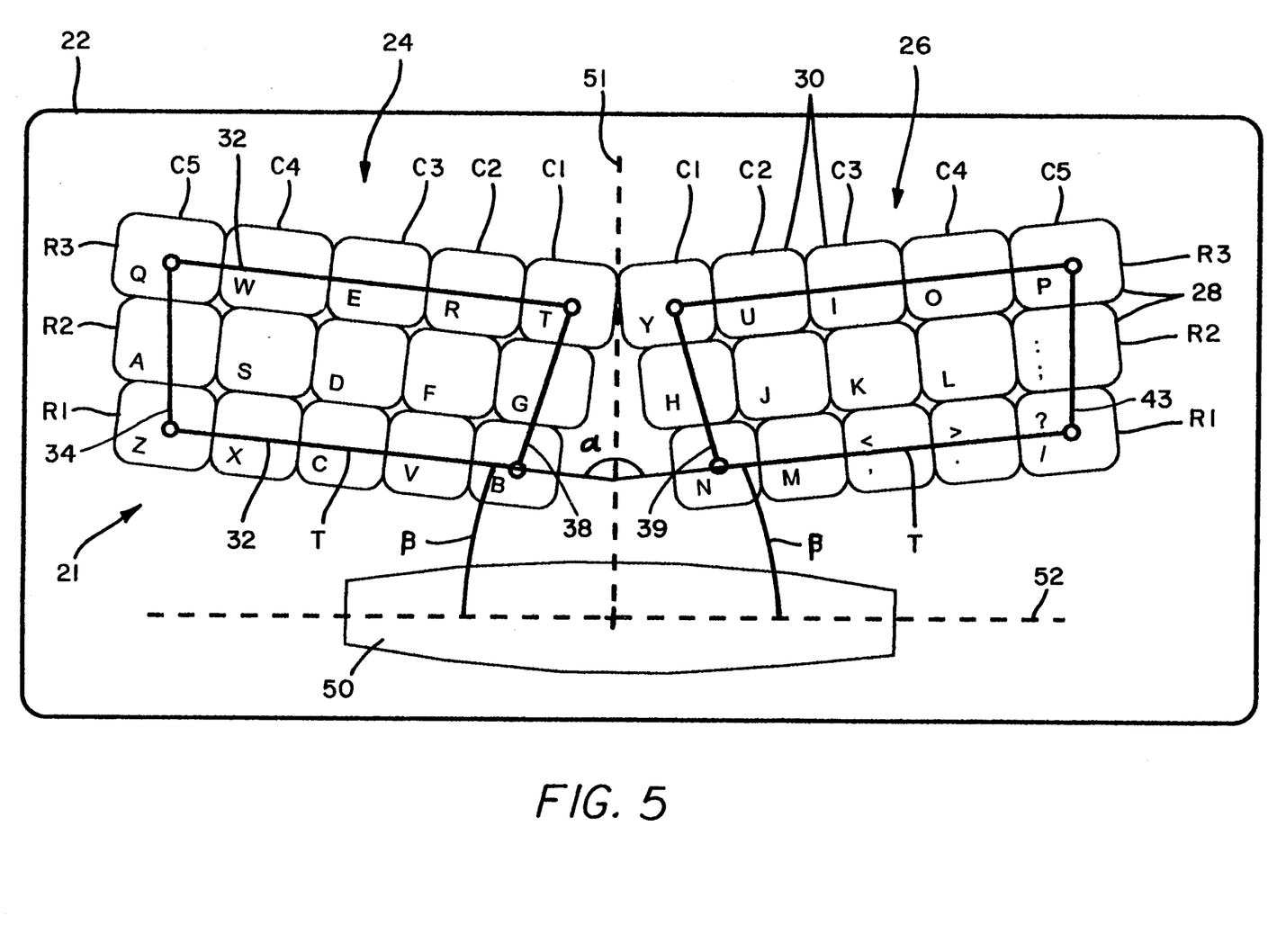
FIG. 5 illustrates the layout of the keyboard in FIG. 3 showing the trapezoidal shape of the QWERTY keys in accordance with the present invention.
Figure 6:
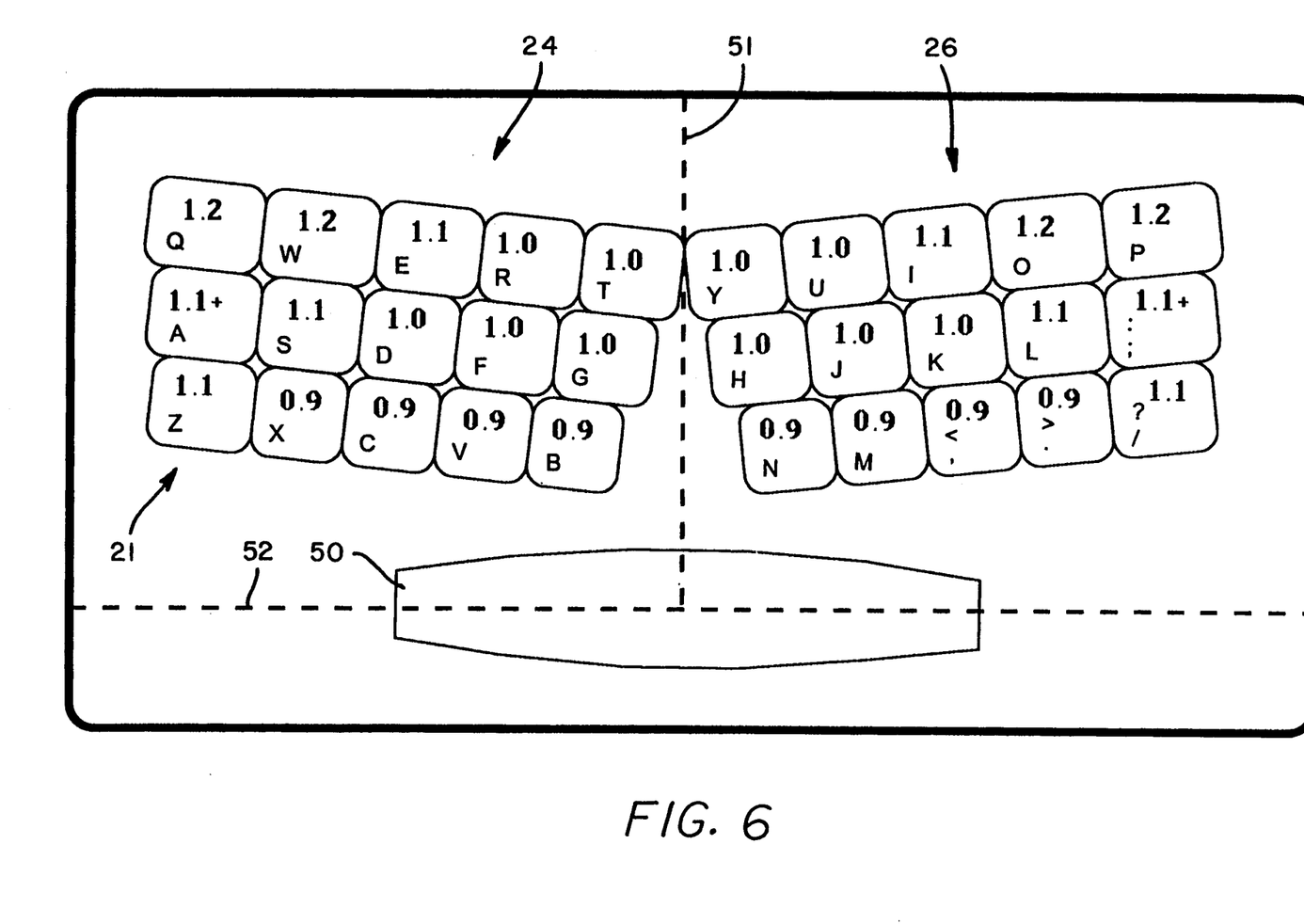
FIG. 6 illustrates the dimensions of the keys in the preferred embodiment of the keyboard.

It will be appreciated that if the keyboard 20 accommodates the natural inclination of the operator's forearms, wrists and hands and the natural fan-like movement of the operator's hands and fingers, the parallel rows and the transverse columns of the keys 21 form a substantially trapezoidal shape T as illustrated in FIG. 5. Referring to FIG. 5, the longitudinal axes 32 of the top row R3 and bottom row R1 in the left section 24 form the parallel sides and the longitudinal axes 38, 34 of first column C1 and fifth column C5 form the nonparallel sides. A similar trapezoid T is formed in the right section 26 by parallel rows R1 and R3 and columns 39 and 43. It will now be appreciated that any pair of parallel rows R1–R3 and any pair of transverse columns C1–C5 will form the trapezoidal shape T. The trapezoidal shape T of the keys 21 permits the operator's fingers to make its natural fan-like movement in contrast to the conventional keyboard 10 which constrains finger movement to narrow parallel columns. In the illustrated embodiment, the trapezoids T formed by the left and right sections 24, 26 are immediately adjacent to each other so that the top innermost key in each section (the T and Y key) are immediately adjacent to each other. It will be appreciated that the distance between the upper row in the left section and the upper row in the right section will be shorter than the distance between the lower rows in each section.

It should now be appreciated that the keys 21 of the keyboard 20 of the present invention form a substantially trapezoidal shape wherein the length of the rows R1–R3 is progressively larger from the bottom row R1 to the top row R3. In the illustrated embodiment, for example, the top row R3 is wider than the middle row R2 and the bottom row R1 is slightly narrower than the middle row R2.

In a preferred embodiment, the length of the rows R1–R3 is varied by altering the size of the individual alphabetic keys 21. The size of the keys 21 in each column C1–C5 is selected based on the natural lines of movement L1–L4 of the fingers F1–F4 and the level of dexterity exhibited by each finger. It will be appreciated that each person has different size hands and fingers and different levels of dexterity so that an unlimited number of key arrangements exists. In order to accommodate the dexterity of the different fingers, it is preferable that the keys 21 operated by the less dexterous fingers, such as the fourth finger F4, be slightly larger or wider than the keys controlled by the more dexterous fingers, such as finger F1. Thus, the larger keys 21 in each row will typically be the outermost keys, e.g., the Q key in the top row R3. Similarly, since fingers F2 and F3 are typically less dexterous than finger F1 and more dexterous than finger F4, the keys controlled by finger F2 and F3 may typically be slightly larger the F1 keys but slightly smaller than the F4 keys. In order to accommodate the lines of movement L1–L4 as the fingers F1–F4 move down and inward toward the palm, it is preferred if the keys in the lower rows are slightly smaller than the keys in the upper rows. It is also preferable if the keys in any column become progressively larger from the lower row to the upper row. It will be appreciated that the above-mentioned descriptions are general and not absolute rules which will apply for every single key 21.

It will also be appreciated that at least one of the alphabetic keys 21 in the top row R3 must be larger than at least one of the middle row keys so that the length of the top row R3 is larger than the middle row R1. Similarly, at least one of the alphabetic keys 21 in the bottom row R1 must be smaller than at least one of the middle row keys so that the bottom row can be smaller than the middle row R2. In one embodiment, the distance between at least one pair of two adjacent keys in an upper row will be greater than the distance between at least one pair of two adjacent keys in a lower row.

In one embodiment (not shown), the orientation of the left and right sections 24, 26 can be adjusted to accommodate operators of different sizes by separating the keyboard into left and right portions according to any conventional means so that the left and right portions contain the keys 21 in the left and right sections 24, 26, respectively. The left and the right portions can be pivotally attached so that the angle $\beta$ or angle $\alpha$ can be selectively adjusted by pivoting the right and left portions relative to each other. The left and right portions of the keyboard can be pivoted in the same plane or they can be pivoted so that they are vertically inclined to each other. Similarly, the left and right trapezoids T may be pivotally attached using any conventional means so that the trapezoids T may be pivoted relative to each other in order to accommodate different size operators.

One embodiment of the dimensions of the keys 21 is illustrated in FIG. 6. In this illustrative embodiment, the keys D,F,G,H,J or K are considered the standard width unit and the widths of other keys are measured relative to the keys D,F,G,H,J or K. The widths described in the embodiment illustrated in FIG. 6 have been found to meet most ergonomic needs but it will be appreciated, however, that the key widths described in FIG. 6 may be varied to accommodate different hand sizes while still keeping within the spirit of the present invention.

In another embodiment (not shown), all of the keys 21 may be the same size in which case the length of each row R1–R3 and the arrangement of the columns C1–C5 is varied by altering the spacing between the respective keys 21. In this embodiment, the keys will also be arranged so that the longitudinal axes of the respective columns substantially align with the lines of movement of the fingers.

FIGS. 3–6 also illustrate an improved space bar 50. The space bar 50 has a wide center portion which narrows at either end. The wide center accommodates the natural position of the thumbs F5 near the vertical axis 36 of the alphabetic keys 21 during the typing operation.

In will now be appreciated that the keyboard 20 of the present invention accommodates the ergonomic movement of the operator including the natural inclination of the operator's forearms, wrists, and hands, and the natural movement of the operator's hands and fingers during the typing operation. Thus, the keyboard will enhance the efficiency, accuracy and speed of the operator because the keys are located in more natural positions for the fingers. The keyboard makes standard touch typing easier and more natural for beginning and intermediate level typists by arranging the keys for each finger in ergonomic and intuitively logical fashion. The present invention, with its fan-like arrangement and ergonomically designed keys, makes it easier to learn to type because beginning typists can visualize the correct keys operated by each finger. As a result, the typist will efficiently use all the fingers properly.

The present invention is also particularly applicable to smaller keyboards such as those found in laptop computers because the problems associated with conventional keyboards, as discussed above, become especially pronounced when the keys are contained in a smaller space.

I claim as my invention:

1. A keyboard for computers, typewriters and similar control devices for use by an operator, the keyboard comprising
    an inside and two opposing outer sides,
    a plurality of keys at least some of which correspond to alphabetic characters,
    left and right key sections wherein the left key section is defined by the keys controlled by a left hand and the right key section is defined by the keys controlled by a right hand, and
    at least two parallel rows of keys disposed in each key section including at least upper and lower rows wherein each row is defined by keys spaced from an inner to an outer key,
    at least two columns of keys disposed in each key section including at least inner and outer columns, each column having a longitudinal axis,
    wherein the longitudinal axes of the inner and outer columns, and the upper and lower parallel rows define a substantially trapezoidal shape having two inner bottom angles which are greater than 90 degrees.

2. The keyboard according to claim 1 wherein each of the left and right sections have at least top, middle and bottom rows and at least first, second, third and fourth columns spaced from the inside to the outer side of the keyboard, and the trapezoidal shape is formed by the parallel top and bottom rows and the second and fourth columns.

3. The keyboard according to claim 1 wherein each of the left and right sections have at least top, middle and bottom rows and at least first, second, third, fourth and fifth columns spaced from the inside to the outer side of the keyboard, and the trapezoidal shape is formed by the parallel top and bottom rows and the first and fifth columns.

4. The keyboard according to claim 1 wherein each key has a midpoint and the distance between the midpoints of any two adjacent keys in the upper row is greater than the distance between the midpoints of any two adjacent keys in the lower row.

5. The keyboard according to claim 4 wherein each of the left and right sections have at least top, middle and bottom rows and the distance between the midpoints of any two adjacent keys in the top row is greater than the distance between the midpoints of any two adjacent keys in the middle row or the distance between the midpoints of any two adjacent keys in the middle row is greater than the distance between the midpoints of any two adjacent keys in the bottom row.

6. The keyboard according to claim 1 wherein each of the left and right sections have a first row, a second row below said first row, and at least one key in the first row larger than at least one key in the second row.

7. The keyboard according to claim 1 wherein each of the left and right sections have at least top, middle and bottom rows so that at least one key in the top row is larger than at least one key in the middle row or at least one key in the bottom row is slightly smaller than at least one key in the middle row.

8. The keyboard according to claim 1 wherein the upper row of alphabetic keys is longer than the lower row of alphabetic keys.

9. The keyboard according to claim 8 wherein each of the left and right sections have at least top, middle and bottom rows so that the length of the top row is greater than the middle row or the length of the middle row is greater than the bottom row.

10. The keyboard according to claim 1 wherein the distance between the innermost keys of the left and right sections at the upper row is less than the distance between the sections at the lower row.

11. The keyboard according to claim 10 wherein each of the left and right sections have at least top, middle and bottom rows so that the distance between the left and right sections at the top row is less than at the middle row or the distance between the left and right sections at the middle row is less than at the bottom row.

12. The keyboard according to claim 1 wherein each of the left and right sections have corresponding top rows and the inner key in the top row of the left section is immediately adjacent to the inner key in the top row of the right section.

13. The keyboard according to claim 12 comprising a pivot assembly for pivotally attaching the left section to the right section near the top inner keys to accommodate different size operators.

14. The keyboard according to claim 1 comprising a centrally located space bar having end portions and a middle portion which is substantially wider than its end portion.

15. The keyboard according to claim 1 wherein the longitudinal axis of each column forms an inner and outer angle with a longitudinal axis of the keyboard so that the inner angles become progressively larger from the inner column to the outer column.

16. The keyboard according to claim 12 wherein the top inner key of the left section is a T key and the top inner key of the right section is a Y key.

17. The keyboard according to claim 16 comprising a pivot assembly for pivotally attaching the left section to the right section at the T key and the Y key to accommodate different size operators.

18. The keyboard according to claim 1 wherein
the longitudinal axes of the rows within each of the left and right section are oriented so that the operator's left and right forearms and wrists, respectively remain substantially straight when the operator uses the keyboard.

19. The keyboard according to claim 18 wherein the longitudinal axes of the rows within each of the left and right sections are substantially perpendicular to the axis of the operator's respective forearm and wrist.

20. The keyboard according to claim 18 wherein the longitudinal axes of the rows within each of the left and right sections form an acute angle with the longitudinal axis of the keyboard.

21. The keyboard according to claim 20 wherein the acute angle is from about 5 to about 70 degrees.

22. The keyboard according to claim 21 wherein the acute angle is about 10 degrees.

23. The keyboard according to claim 18 wherein the longitudinal axis of the left and right sections form an angle from about 40 to about 170 degrees.

24. The keyboard according to claim 23 wherein the longitudinal axis of the left and right sections form an angle about 150 degrees.

25. The keyboard according to claim 18 comprising a pivot assembly for pivotally attaching the left section to the right section to accommodate different size operators.

26. A keyboard for typewriters and similar control devices for use by an operator, the keyboard comprising
a plurality of keys at least some of which correspond to alphabetic characters,
left and right key sections so that the left key section is defined by the keys controlled by a left hand and the right key section is defined by the keys controlled by a right hand, and
at least two parallel rows of keys disposed in each key section wherein each row is defined by keys spaced from an inner to an outer key,
at least two columns of keys disposed in each key section wherein each column is spaced from an inner to an outer column wherein at least one column has at least a lower and upper key disposed from a bottom to a top of the keyboard so that the upper key is larger than the lower key, each column having a longitudinal axis,
wherein the longitudinal axes of the inner and outer columns, and the top and bottom parallel rows define a substantially trapezoidal shape having two inner bottom angles which are greater than 90 degrees.

27. The keyboard according to claim 26 wherein each column is disposed so that its longitudinal axis substantially aligns with the line of movement of a finger of the operator which controls the column as the finger curls and uncurls in the inputting operation.

28. The keyboard according to claim 26 wherein the keys are disposed on the keyboard so that the longitudinal axis of each column forms an inner and outer angle with a longitudinal axis of the keyboard so that the inner angles become progressively larger from the inner column to the outer column.

29. The keyboard according to claim 26 wherein each column has at least top, middle and bottom keys so that the top key is larger than the middle key or the middle key is larger than the bottom key.

30. The keyboard according to claim 26 wherein at least one column has keys disposed from the bottom to the top of the keyboard which are progressively larger from the lower key to the upper key.

31. The keyboard according to claim 26 wherein the column is defined by keys which are progressively wider from the lower key to the upper key.

32. A keyboard for computers, typewriters and similar control devices for use by an operator, the keyboard comprising
a plurality of keys at least some of which correspond to alphabetic characters,
at least two parallel rows of keys including at least top and bottom rows wherein each row is defined by keys spaced from an inner to an outer key, and at least one row having at least one of the outer keys being larger than one of the inner keys,
at least two columns of keys including at least inner and outer columns,
wherein longitudinal axes of the inner and outer columns, and the top and bottom parallel rows define a substantially trapezoidal shape having two inner bottom angles which are greater than 90 degrees.

33. The keyboard according to claim 32 wherein each outer key is progressively larger than the inner key.

34. The keyboard according to claim 32 wherein the keys are progressively wider from the inside key to the outside key.

35. The keyboard according to claim 32 wherein any outer alphabetic key is larger than at least one inner alphabetic key in the same row.

36. A keyboard for computers, typewriters and similar control devices for use by an operator, the keyboard comprising
a plurality of keys at least some of which correspond to alphabetic characters arranged in a left-hand section and a right-hand section,
at least three row of keys in each section wherein each row is defined by keys spaced from an inner to an outer key, and all three rows having at least a middle key which is smaller in width than the outer key, and the inner key which is smaller in width than the middle key.

37. The keyboard according to claim 36 wherein the rows are arranged in left and right sections so that the left section contains the keys controlled by a left hand and the right section contains the keys controlled by a right hand.

38. The keyboard according to claim 36 wherein the keys in each row are progressively larger from the inner to the outer key.

39. The keyboard according to claim 36 wherein some of the keys in each row are the same size.

40. A keyboard for computers, typewriters and similar control devices for use by an operator, the keyboard comprising
a plurality of keys at least some of which correspond to alphabetic characters arranged in a left-hand section and a right-hand section, and
at least five columns of keys in each section including at least inner and outer columns, each column having keys spaced from a bottom to a top of the keyboard wherein at least two columns in each section are defined by at least an upper key, a middle key which is smaller in width than the upper key, and a lower key which is smaller in width than the middle key.

41. The keyboard according to claim 40 wherein the second, third, and fourth columns in each section are defined by an upper key, a middle key which is smaller in width than the upper key, and a lower key which is smaller in width than the middle key.

42. The keyboard according to claim 40 wherein the keys in each column are progressively larger from the lower to the upper key.

* * * * *